(12) United States Patent
Hayashi (10) Patent No.: US 6,680,696 B1
(45) Date of Patent: Jan. 20, 2004

(54) POSITIONING SATELLITE SYSTEM FOR MEASURING POSITION OF SIGNAL SOURCE

(75) Inventor: Tomonao Hayashi, Tokyo (JP)

(73) Assignee: Chiba Institute of Technology, Chiba (JP)

( * ) Notice: Subject to any disclaimer, the term of this patent is extended or adjusted under 35 U.S.C. 154(b) by 0 days.

(21) Appl. No.: 10/089,348

(22) PCT Filed: Apr. 10, 2000

(86) PCT No.: PCT/JP00/06879

§ 371 (c)(1),
(2), (4) Date: Mar. 27, 2002

(87) PCT Pub. No.: WO01/25815

PCT Pub. Date: Apr. 12, 2001

(30) Foreign Application Priority Data

Oct. 4, 1999 (JP) ............................................ 11-282359

(51) Int. Cl.[7] .............................. G01S 5/12; H04B 7/185
(52) U.S. Cl. ............................ 342/357.16; 342/357.07; 342/357.09; 342/357.05
(58) Field of Search ........................ 342/357.16, 357.05, 342/357.06, 357.09, 357.13, 357.07; 701/226

(56) References Cited

U.S. PATENT DOCUMENTS

| | | | | |
|---|---|---|---|---|
| 5,528,502 A | * | 6/1996 | Wertz | .......................... 701/226 |
| 5,592,175 A | | 1/1997 | Tayloe | |
| 5,767,804 A | | 6/1998 | Murphy | |
| 5,955,986 A | | 9/1999 | Sullivan | |
| 6,114,995 A | * | 9/2000 | Ketchum | ..................... 701/226 |
| 6,424,913 B1 | * | 7/2002 | Fichter et al. | .............. 701/226 |

OTHER PUBLICATIONS

Levanon, N.: "Quick Position Determination Using 1 or 2 Leo Satellites"; IEEE Transactions On Aerospace and Electronic Systems, US, IEEE, Inc. New York, vol. 34, No. 3, Jul. 1, 1998; pp. 736–754, XP00007716555; ISSN: 0018-9351 p.737–p. 738.

Bessis, J.L.: "Data Collection and Location By Satellite: The Argos System"; Advances In Earth Oriented Applications of Space Technology, vol. 1, No. 4, 1981, pp. 193–203, XP000978343 UK, Section "User Platforms", p. 193–194.

* cited by examiner

Primary Examiner—Thomas H. Tarcza
Assistant Examiner—F H Mull
(74) Attorney, Agent, or Firm—McCormick, Paulding & Huber LLP (57) ABSTRACT

A satellite system includes a signal source located on a surface of the earth, a surface of water, or in air; an orbiting satellite for measuring a position of the signal source, having a GPS receiver which receives a GPS signal from a GPS satellite system to measure the position of the orbiting satellite, a frequency measuring device for receiving the radio wave signal emitted from the signal source to measure the frequency thereof, a memory for storing frequency data and position data, and a transmitting device for transmitting the data stored in the memory toward the earth; and a ground station, having a signal receiving device for receiving the data transmitted from the orbiting satellite, including a computer for calculating the position of the signal source based on the data received by the signal receiving device.

11 Claims, 7 Drawing Sheets

POSITIONING SATELLITE SYSTEM FOR MEASURING POSITION OF SIGNAL SOURCE

CROSS REFERENCE TO RELATED APPLICATIONS

This application is entitled to the benefit of the filing date of, and hereby incorporates by reference the subject matter disclosed in, Japanese Patent Application No. 11-282359 filed on Oct. 4, 1999, as well as International Application No. PCT/JP00/06897 filed on Oct. 4, 2000.

FIELD OF THE INVENTION

The present invention relates to a positioning method and an apparatus to measure a position of a signal source moving on the earth's surface, on the surface of water, or in the air.

BACKGROUND OF THE INVENTION

In recent years, a position tracking system to track the movement of wild animals in order to protect the same, and for ecological research thereof, has been developed. For instance, to research the ecology and behavior of whales, a transmitter is attached to a whale, so that a radio wave output from the transmitter is received by a receiver provided in an aircraft or a vessel to obtain positional data of the transmitter to thereby track the position of the whale. In this tracking system, it is impossible to simultaneously track a number of individual whales ranging over a large area. Furthermore, the tracking system using an aircraft or vessel is suitable for tracking for a short period of time, but it is difficult to continuously carry out the tracking for a long time, e.g., several months. Moreover, it is extremely difficult to track birds having a high moving speed and wide home range even for a short period of time. In addition, data obtained by the tracking must be transferred from the aircraft or vessel to researchers in a ground facility by a transmission device, which proved to be very inconvenient.

A portable GPS (Global Positioning System) receiver which is designed to receive a GPS signal from a GPS (NAVSTAR) satellite in order to obtain positional data has been developed. However, it is necessary for the GPS receiver to receive GPS signals from at least four satellites in order to measure a position on earth. To this end, the GPS receiver must receive the GPS signals for a long time. Therefore, it is difficult to track an animal such as a whale that appears on the sea surface for a very short period.

Moreover, it is difficult to miniaturize an antenna of the GPS receiver which receives weak GPS signals, and accordingly, it is difficult to make a small GPS receiver. This makes it impossible to attach the GPS receivers to small animals such as birds.

SUMMARY OF THE INVENTION

It is an object of the present invention to eliminate the drawbacks mentioned above by providing a positioning satellite system in which the position of an animal can be continuously tracked for a long time, regardless of the speed or range of the movement of the animal, and in which the signal source to be attached to the animal can be made small.

To achieve the object mentioned above, according to an aspect of the present invention, a satellite system is provided, including a signal source located on or in at least one of a surface of the earth, a surface of water, and the air, the signal source including a transmitter device for emitting a radio wave signal having a predetermined frequency and an identification code corresponding to a specific objective; an orbiting satellite for measuring a position of the signal source, the orbiting satellite including a GPS receiver which receives GPS signals from a GPS satellite system to measure the position of the orbiting satellite, a frequency measuring device for receiving the radio wave signal emitted from the signal source to measure the frequency of the radio wave signal, a memory for storing frequency data measured and obtained by the frequency measuring device and position data measured and obtained by the GPS receiver upon measurement of the frequency of the radio signal, and a transmitting device for transmitting the data stored in the memory toward the earth's surface; and a ground station having a signal receiving device for receiving the data transmitted from the orbiting satellite, the ground station including a computer for calculating the position of the signal source based on the received data of the signal device.

Preferably, the frequency measuring device includes a phase-lock loop receiver.

Preferably, the frequency measuring device and the GPS receiver carry out several measurements of the radio wave signals emitted from the same signal source during the movement of the orbiting satellite, on and along the same orbit, on which the frequency measuring device and the GPS receiver are provided so that the measurement data of each measurement is stored in the memory.

Preferably, the orbit of the orbiting satellite is a polar orbit or sub-recurrent orbit.

The computer can measure the position of the signal source based on reference frequency data of the radio wave signal emitted from the signal source; wherein the frequency data is measured by the frequency measuring device, and the position data of the orbiting satellite is measured by the GPS receiver.

Preferably, the orbiting satellite includes a signal receiving device for receiving the radio wave signal emitted from the ground station; the ground station including a transmitting device for transmitting a specific command to send the data stored in the memory of the orbiting satellite; and the orbiting satellite transmitting the data stored in the memory via the transmitting device upon receipt of the specific command through the signal receiving device.

Preferably, when the radio wave signal of the predetermined frequency is emitted, the signal source sends an identification signal to identify the signal source by the radio wave signal.

According to another aspect of the present invention, a satellite system is provided, including a signal source located on or in at least one of a surface of the earth, a water surface, and the air; and an orbiting satellite for measuring a position of the signal source, the orbiting satellite including a GPS receiver which receives GPS signals from a GPS satellite system, a frequency measuring device for receiving a radio wave signal emitted from a ground signal source on the earth to measure the frequency of the radio wave signal, a memory for storing frequency data measured and obtained by the frequency measuring device and position data measured and obtained by the GPS receiver upon measurement of the frequency, and a transmitting device for transmitting the data stored in the memory toward the earth's surface.

According to another aspect of the present invention, a ground station is provided, including a signal receiving device for receiving data transmitted from an orbiting satellite; and a computer for analyzing the data received by the receiving device. The orbiting satellite includes a GPS receiver which received the GPS signals from a GPS satellite system to measure the position of the orbiting satellite; a frequency measuring device for receiving the radio wave signal emitted from signal source located on or in at least one of a surface of the earth, a surface of water, and the air, to measure the frequency of the radio wave signal; a memory for storing frequency data measured and obtained by the frequency measuring device and position data measured and obtained by the GPS receiver upon measurement of the frequency of the radio signal; and a transmitting device for transmitting the data stored in the memory toward the earth's surface.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
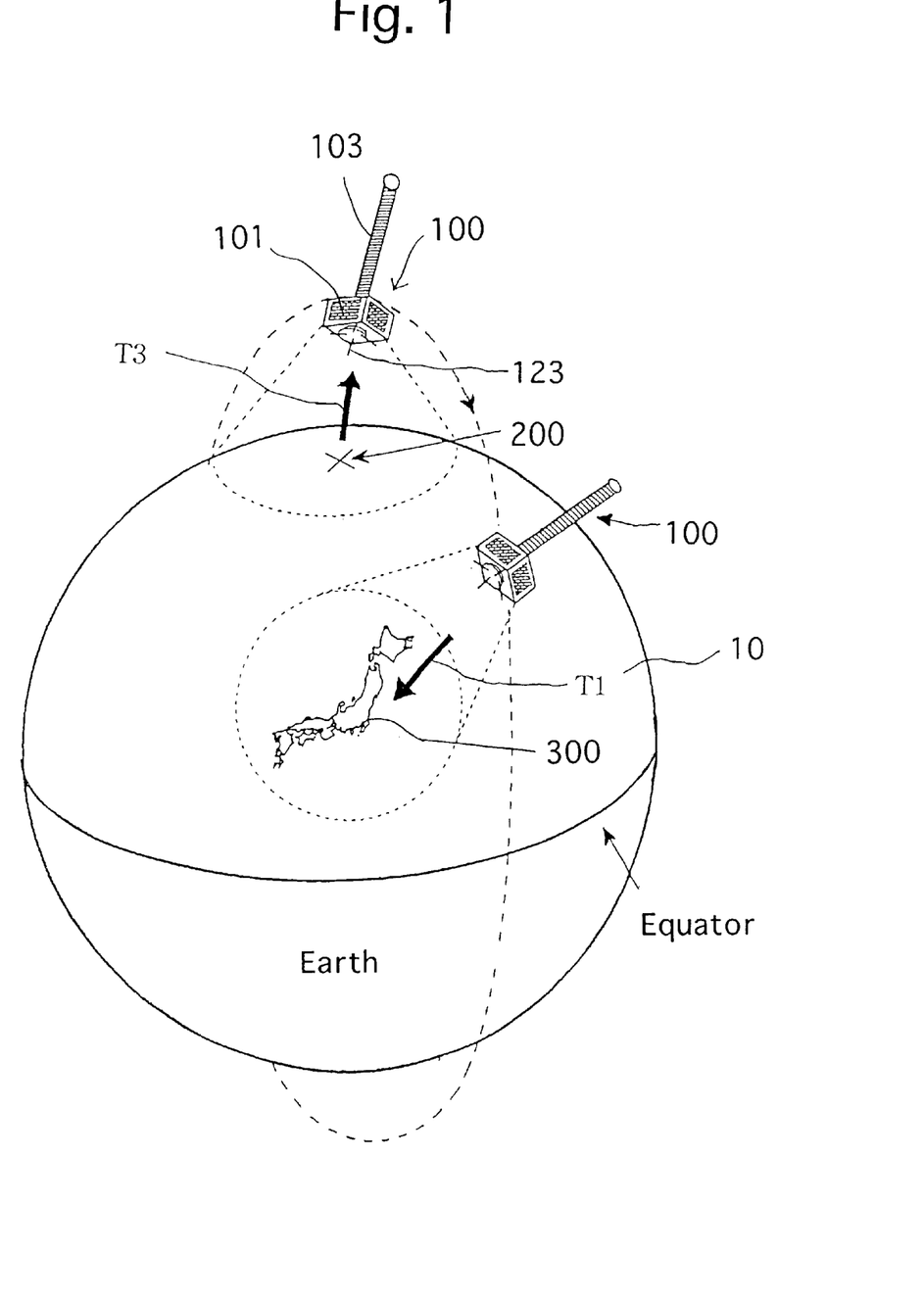
FIG. 1 is a schematic view of an embodiment of a positioning satellite system according to the present invention.
Figure 2:
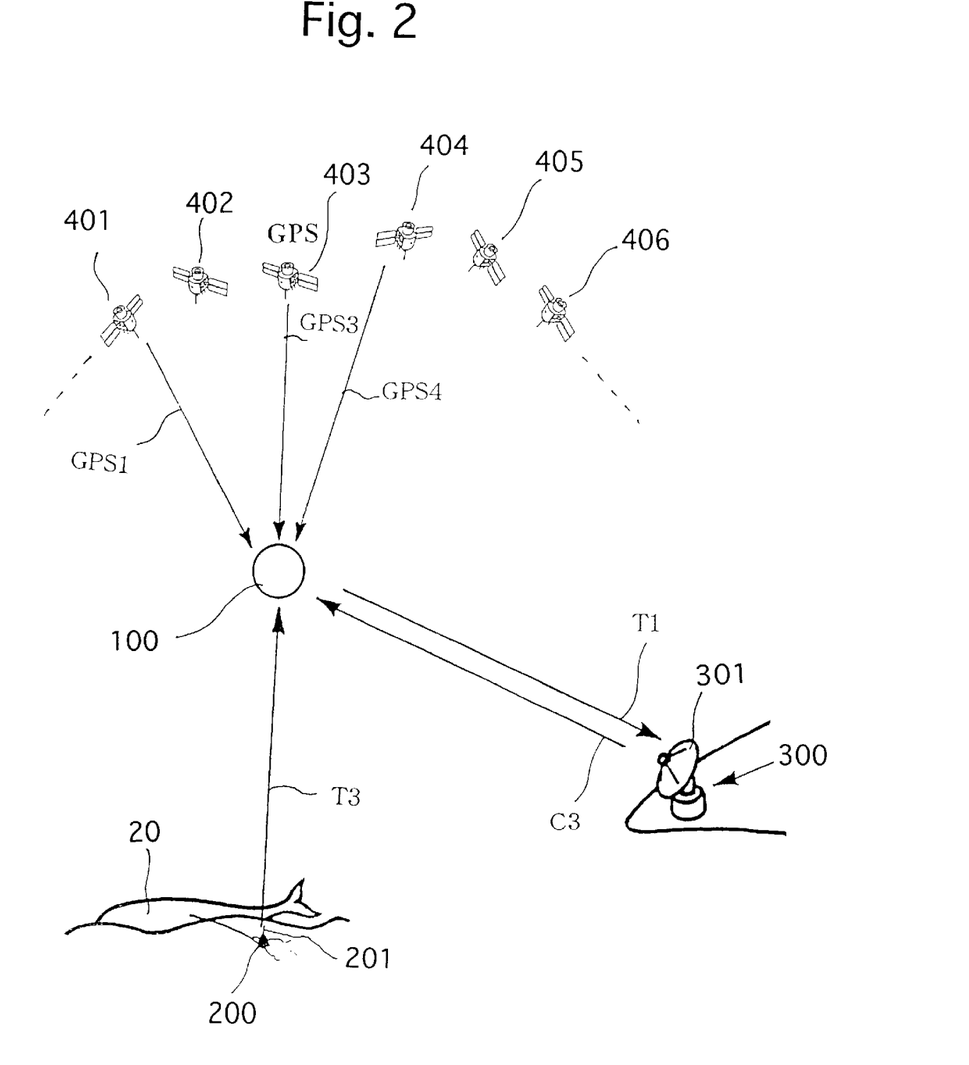
FIG. 2 is a schematic view of an embodiment of a positioning satellite system according to the present invention.

FIGS. 1 and 2 show an embodiment of the present invention, applied to a whale ecology observation satellite (WEOS).

An artificial satellite (orbiting satellite) 100 is a polar orbit satellite which orbits over the North Pole and the South Pole of the earth 10 and moves over a base station 300 as a ground facility on the earth 10 at a predetermined period. The altitude and speed of the satellite 100 are approximately 800 km and 8 km/sec, respectively. Note that the orbit is preferably a polar orbit, however the present invention can be applied to any orbit other than the polar orbit, for example, a sub-recurrent orbit. Also, the altitude is not limited to a specific value.

The satellite 100 is provided with a GPS receiver 133 (see FIG. 4) which receives GPS (Global Positioning System) signals from twenty four GPS (NAVSTAR) satellites 401, 402, 403, 404, 405, 406 . . . which are higher than the satellite 100 to measure its own orbital coordinates (altitude, latitude and longitude). Only six GPS (NAVSTAR) satellites are shown in FIG. 2. The satellite 100 is also provided with a Doppler shift receiver which receives measuring radio wave (uplink signal) T3 of a specific frequency (around 400 MHz), output from a signal source 200 on the earth 10 to measure a frequency shift. The signal source 200 repeatedly emits the measuring radio wave T3 at a predetermined time interval. The satellite 100 obtains frequency data (or frequency shift data) of the measuring radio wave T3, and coordinate data of the satellite 100, every time the satellite 100 receives the measuring radio wave T3, and the data is stored in a memory provided in the satellite 100.

The base station 300 outputs a data transmission command radio wave C3 to the satellite 100 via the parabolic antenna (transmitting device) 301 when the satellite 100 moves over the base station. When the satellite 100 receives the data transmission command radio wave C3, the data stored in the memory of the satellite 100 is transmitted toward the earth (base station 300) by an antenna (transmitting device) 127 via the signal radio wave T1. The base station 300 receives the signal radio wave T1 via the parabolic antenna (signal receiving device) 301. Consequently, the position (coordinates) of the signal source 200 is calculated based on the frequency shift data, the coordinate data of the satellite 100, and the speed data of the satellite 100 by a computer provided in the base station 300.

The signal source 200 is a transmitter which repeatedly outputs the measuring radio wave T3 of the specific frequency (about 400 MHz) at a predetermined time interval. The measuring radio wave T3 carries at least identification code data assigned to each signal source 200. The signal source 200 outputs the measuring radio wave T3 at a predetermined time interval while a whale 20 appears on the sea surface and the antenna (emitter device) 201 of the signal source 200 extends upward from the sea surface.

The signal source 200 in the illustrated embodiment is incorporated in an ecological study probe for a whale 20. The ecological study probe is provided therein, for example, with a pressure sensor to measure the diving depth of the whale, a temperature sensor, a microphone to pickup the call of the whale, a memory in which data detected or obtained by the sensors and the microphone is stored as digital signals, and a battery as a power source for the same, etc. The data thus obtained is transmitted when the measuring radio wave T3 is transmitted from the signal source 200.

Figure 3:
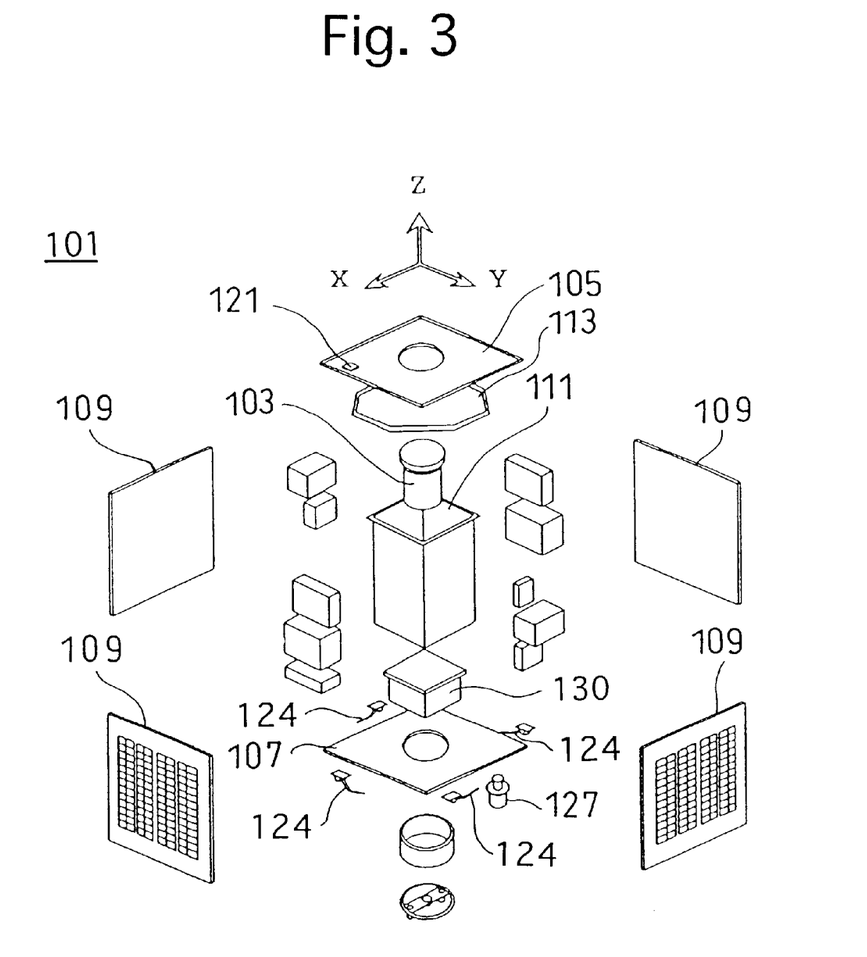
FIG. 3 is an exploded perspective view of a satellite according to the present invention.

FIG. 3 shows an exploded perspective view of the main components of the satellite 100. The satellite 100 is comprised of a body 101 and an attitude control mast 103 (see FIG. 1). The body 101 is provided on its center with a box 111 having a square section, a top plate 105 and a bottom plate 107 attached to the upper and lower ends of the box 111, and four solar panels 109 which are secured at their upper and lower edges to the top and bottom plates 105 and 107 to surround the box 111. The extendable attitude control mast 103 is secured to the upper end of the box 111. The box 111 is provided with main electronic elements 130. Other electronic parts are arranged in a space defined between the box 111 and the solar panels 109. The attitude control mast 103 extends outward through a central hole formed in the top plate 105. Note that the attitude control mast 103 is shown in a retracted position in FIG. 3.

A GPS antenna 121 is attached to the outer surface of the top plate 105 which is oriented in an opposite direction to the earth. Four antenna elements 124 (see FIG. 3) which operate in a UHF band have two functions, one function is to receive the radio wave T3 for measuring the frequency through antennas 123 (of FIG. 4), and the other function is to receive the command radio wave C3 through antenna 125 (of FIG. 4). The antenna (transmitting device) 127 which transmits a signal radio wave T1 is secured to the outer surface of the bottom plate 107 which faces the earth 10. The body 101 is also provided with a torque coil 113 which is adapted to control the attitude of the satellite 100 so that the axis thereof is oriented toward the center of the earth 10.

Figure 4:
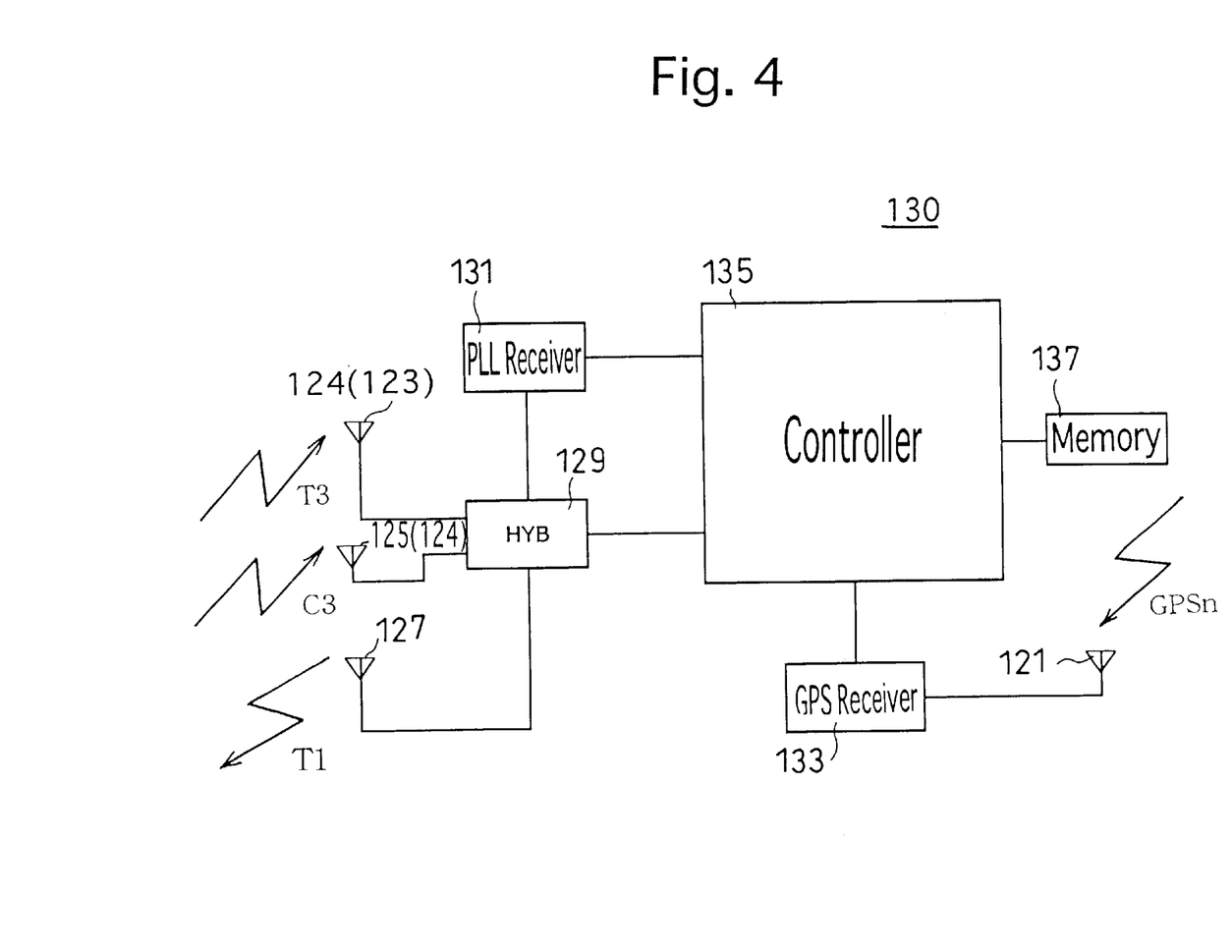
FIG. 4 is a block diagram of a control system for a satellite shown in FIG. 3.

The main electronic elements 130 of the satellite 100 are shown in a block diagram of FIG. 4. The satellite 100 is generally controlled by a micro computer (CPU) provided in a control circuit (controller) 135. The measuring radio wave T3 emitted from the signal source 200 is received by the antennas 123 and is distributed to a PLL receiver (phase-lock loop receiver/frequency measuring device) 131 via an HYB circuit 129. The PLL receiver 131 controls the oscillation frequency so that the phase of the frequency is synchronized with the phase of the input measuring radio wave T3. The controlled frequency is stored in a memory 137 as measured frequency data. By counting the frequency fo the controlled oscillator in synchronization, a Doppler frequency shift corresponding to the slant range rate between the satellite 100 and the signal source 200 is readily obtained.

The satellite 100 which receives the measuring radio wave T3 receives the GPS signals emitted from the GPS satellites 401, 402, 403, 404, 405, 406, . . . via the GPS antenna 121, so that the GPS receiver 133 calculates the position (orbital coordinates of latitude and longitude) of the satellite 100. The calculated data is written in the memory 137 as position data of the satellite 100 upon measurement of the measuring frequency data.

The control circuit 135 repeatedly carries out the operations mentioned above every time the control circuit 135 receives the measuring radio frequency T3, and stores the measurement time, the measured frequency data, and the measured position data in the memory 137.

A predetermined command is carried and sent by the command radio wave C3 to the satellite 100 when the satellite 100 travels above the base station 300. The control circuit 135 analyzes the command radio wave C3 which has been received by the antenna 125 and distributed by the HYB circuit 129. If the signal represents a predetermined command, all the measured frequency data and position data stored in the memory 137 are sent by modulating the signal radio wave T1 which is output through the antenna (transmitting device) 127.

The base station 300 receives the measured frequency data and position data, etc., carried by the signal radio wave T1 emitted from the satellite 100 and stores the same in a memory of the base-station computer. Consequently, the position (orbital coordinates of latitude and longitude) of the signal source 200 is calculated based on the plural sets of measured frequency data and position data, obtained within a predetermined time.

As can be understood from the foregoing, the observer can determine the position of the whale 20 at any position on the earth. Since the signal source 200 is only required to periodically emit a weak radio wave, in a short space of time, which can be received by the satellite 100 it is possible to miniaturize the components including the battery therefor. Therefore, it is possible to track and observe the position and movement of not only large-sized animals such as whales but also small-sized animals, for example, migratory birds such as cranes or wild geese. Moreover, since the satellite 100 in the illustrated embodiment orbits the earth along a polar orbit, one satellite 100 and one base station 300 can cover the whole earth.

The position detection method of the signal source 200 will be discussed hereinafter. In the illustrated embodiment, when the satellite 100 moves over the base station 300, the PLL receiver 131 of the satellite 100 receives the measuring radio waves T3 transmitted from the base station 300 as reference data at a predetermined time interval. The frequency of the measuring radio wave T3 and the position of the satellite 100 are measured every time the satellite receives the measuring radio wave. The measurement data is stored in the memory 137. The measurement of the position will be discussed below in detail.

It is assumed that the distance between the satellite 100 and the signal source 200 is D(t;Pt), wherein "t" represents the time at the satellite 100 and "PT" represents the position of the signal source 200. The angular acceleration D of the satellite 100 is given by D=dD/dt. Thus, the following formula (1) is obtained, provided that the relative effect is ignored.

$$f_R(t;P_T) = \{1+\epsilon(T;P_t)\}f_T$$
$$\epsilon(t;P_t) = -C^{-1}\dot{D}(t;P_t) \quad (1)$$

wherein "fT" represents the frequency of the measuring radio wave T3, "fR" represents the frequency of the radio wave received by the satellite 100, "C" represents the velocity of light, and "ε" represents the Doppler coefficient, respectively.

The frequency $f_T$ fluctuates within the range of a design value fo. The frequency $f_L$ is a reference frequency used to measure the frequency $f_R$ in the satellite 100. For convenience sake, the standard frequency deviations of the frequencies $f_T$ and $f_L$ are $\delta_T$, $\delta_L$, respectively, the following expressions are given by the following equation (2);

$$f_T = fo(1+\delta_T)$$
$$f_L = fo(1+\delta_L) \quad (2)$$

The Doppler shift is defined by a difference between the frequencies $f_R$ and fT, which can be obtained by the above expressions. Therefore, the following equation (3) is obtained using the measured Doppler shift $(f_R - f_L)$ as "an apparent Doppler coefficient".

$$\hat{\varepsilon} \equiv \frac{f_R - f_L}{f_0} = \frac{(1+\varepsilon)f_r - f_L}{f_0} \quad (3)$$
$$= (1+\varepsilon)(1+\delta_T) - (1+\delta_L) \approx \varepsilon + (\delta_T - \delta_L)$$

Since ε and δT are both smaller than 1, $\epsilon\delta_T$ is negligible. In practice, many factors have an influence on the measurement of the Doppler coefficient ε. If the possible influences are all treated as effective noise ν, the following equation (4) is obtained.

$$\varepsilon^{meas} = \hat{\varepsilon} + \nu = \varepsilon + \Delta + \nu \quad (4)$$
$$\Delta \equiv \delta_T - \delta_L$$

In general, the stability of the signal source 200 and the satellite 100 in the short oscillation period is extremely high, and hence, the variation Δ during the measurement of the position is negligible. Consequently, the variation Δ can be considered an unknown constant.

It is assumed that "$\epsilon_n$" represents the $n^{th}$ Doppler coefficient measured at the sampling time $t_n$. Assuming that the signal source 200 is at the position P1, the Doppler coefficient is given by $\{\epsilon(t_n;P_T)+\Delta\}$. Therefore, the square deviation between the Doppler coefficient and the actual measurements at the N sampling points is given by the following equation (5):

$$S(P_T, \Delta) = \sum_{n=1}^{N} \{\epsilon(t_n; P_T) + \Delta - \epsilon_n^{meas}\}^2 \quad (5)$$

If S is minimum at $(P_t, \Delta) = (P_T^{min}, \Delta^{min})$, it can be presumed that the value of $P_T^{min}$ represents the correct position of the signals source 200. However, since S is a square-function of $\Delta$, S is minimum when $\Delta$ satisfies the following equation (6).

$$\Delta^{optm}(P_T) = \frac{1}{N}\sum_{n=1}^{N} \{\epsilon_n^{meas} - \epsilon(t_n; P_T)\}, \quad (6)$$

The minimum value is given by the following equation (7):

$$F(P_T) \equiv S(P_T, \Delta^{optm}(P_T)) \quad (7)$$
$$= \sum_{n=1}^{N} \{\epsilon_n^{meas} - \epsilon(t_n; P_T)\}^2 - N\{\Delta^{optm}(P_T)\}^2$$

Therefore, in the illustrated embodiment, it is necessary only to obtain the proximity function $F(P_T)$, in place of $S(P_T, \Delta)$ in order to obtain $P_T^{min}$.

The practical theory will be discussed below.

In general, the center of gravity of the earth can be determined based on the coordinate system. If the Z-axis is selected to be the direction of the angular momentum of the satellite 100, and the X-axis is selected to be the major axis of the orbit, the position $r_s$ of the satellite 100 is defined by the following formula (8):

$$r_s = \begin{pmatrix} x_s \\ y_s \\ z_s \end{pmatrix} = \begin{pmatrix} r\cos\varphi \\ r\sin\varphi \\ 0 \end{pmatrix}, r = \frac{a(1-e^2)}{1+e\cos\varphi} \quad (8)$$

$\varphi$ represents the zenith angle, "a" represents the mean radius of the orbit, and e represents the eccentricity of the orbit, respectively.

The time derivative of $\varphi$ is given by the following formula (9).

$$\dot\varphi = \frac{\sqrt{GMa(1-e^2)}}{r^2} \quad (9)$$

wherein G represents the gravitational constant and M represents the weight of the earth, respectively.

Since r relies only upon the time t via $\varphi$, r can be obtained by the following equation (10), as a result of the formula 8:

$$\dot r = \frac{dr}{d\varphi}\dot\varphi = \frac{er^2\sin\varphi}{a(1-e^2)}\dot\varphi \quad (10)$$

The position $P_T=r_T$ of the signal source 200 can be limited to that of the earth surface, the position of the signal source 200 can be simplified using polar coordinates $(\Theta, \Phi)$. If R designates the radius of the earth, the distance $D(t;P_T)$ between the satellite 100 and the signal source 200 is obtained by the following expression (11):

$$D(t; P_T) = \|r_s - r_T\| \quad (11)$$
$$= \sqrt{R^2 + r^2 - 2Rr\sin\Theta\cos(\varphi - \Phi)}$$

The velocity in the radial direction is obtained by the following expression (12):

$$\dot D(t; P_T) = \frac{dD(t; P_T)}{dt} \quad (12)$$
$$= \frac{r\dot r - Rr\sin\Theta\cos(\varphi-\Phi) + Rr\sin\Theta\sin(\varphi-\Phi)\dot\varphi}{\sqrt{R^2 + r^2 - 2Rr\sin\Theta\cos(\varphi-\Phi)}}$$

If we substitute formula 12 for formula 10, the following formula 13 is obtained.

$$\epsilon(t; P_T) \equiv -\frac{\dot D(t; P_T)}{c} \quad (13)$$
$$= \beta\frac{\{\rho\sin(\Phi-\varphi) + \lambda\cos(\Phi-\varphi)\}\sin\Theta - \lambda\rho}{\sqrt{1+\rho^2 - 2\rho\sin\Theta\cos(\Phi-\varphi)}}$$

The non-dimensional variables p, β, λ are defined by the following expressions (14):

$$\rho \equiv \frac{r}{R} = \frac{\gamma}{1+e\cos\varphi}, \quad \beta \equiv \frac{1}{c}\sqrt{\frac{\gamma GM}{R}}\frac{1}{\rho^2} \quad (14)$$
$$\lambda \equiv \frac{e}{\gamma}\rho^2\sin\varphi$$

wherein γ is a non-dimensional variable as defined in Equation 15 below.

$$\gamma \equiv \frac{a(1-e^2)}{R} \quad (15)$$

When e=0, as in a circular orbit, the variables ρ and β are not dependent upon time, and hence λ=0. However, in general, β, λ and ρ are dependent upon time via $\varphi$. In any case, the proximity function F can be expressed by a function $(\Theta, \varphi)$ which is obtained by substituting equation 13 for equation 7. The position of the signal source 200 can be estimated by minimizing the two variables of the proximity function F $(\Theta, \varphi)$.

$\epsilon(t;Pr)$ is dependent only upon $\Theta$ through sin $\Theta$, as can be seen in equation 13.

$$F(\Theta, \varphi) = F(\pi-\Theta, \varphi) \quad (16)$$

If equation 16 is satisfied and $(\Theta^{min}, \varphi^{min})$ minimizes the proximity function F $(\pi-\Theta^{min}, \varphi^{min})$ becomes minimum. If the satellite 100 orbits over the signal source 200, the previous proximate calculation result and the current proximate calculation result are compared in the position measuring operation to obtain the two minimum positions.

On the assumption that the radial distance from the center of the earth to the signal source 200 is r, if the requirement of $(D^2 \leq r^2-R^2)$ is satisfied, it is possible to receive the signal from the signal source 200 on the sea. According to equation 11, the requirement is expressed by the following equation (17):

$$1+e\cos\varphi \leq \gamma\sin\Theta\cos(\Theta-\Phi) \quad (17)$$

For example, when $\Theta=0$, or $\Theta=\pi$ (when the signal source 200 is located in the X-Z plane), equation 17 can be replaced with the following equation 18.

$$\cos\varphi \geq \frac{1}{\gamma \sin\Theta \mp e} \quad (18)$$

wherein the negative sign corresponds to $\phi=0$. So long as $\Theta$ satisfies equation 19, equation 18 can be used as a practical solution to obtain $\Theta$.

$$\Theta \geq \sin^{-1}\frac{1 \pm e}{\gamma} = \sin^{-1}\frac{R}{a(1 \mp e)} \quad (19)$$

The foregoing has been applied to a method for determining an approximate position of the signal source 200 using the Doppler effect. The accuracy of this method for determining the position of the signal source 200 will be discussed below.

It is assumed that the orbit of the satellite 100 is an elliptical orbit (apoapsis "a"=7178 km , eccentricity "e"= 0.01393) in which the maximum altitude is 900 km, and minimum altitude is 700 km. First, the Doppler coefficient $\{\epsilon_n^{true}\}_{n=1\sim N}$ at $\{t_n\}_{n=1\sim N}$ is calculated when the true position of the signal source 200 is given by $(\Theta_{true}, \phi_{true})$. Consequently, for all the variables which depend upon the time via $\phi$, $\{\phi_n\}_{n=1\sim N}$ is used in place of $\{t_n\}_{n=1\sim N}$. Since the sampling points $\{\phi_n\}_{n=1\sim N}$ are assumed to be regular, the pitch $[\Theta 1, \Theta N]$ corresponds to the "measurement pitch", and accordingly, all the measurements are carried out at this pitch. To simulate the Doppler coefficient $\{\epsilon_n^{true}\}_{n=1\sim N}$, noise and a constant $\Delta$ are added to the Doppler coefficient $\{\epsilon n^{true}\}_{n=1\sim N}$. The minimum position of the proximity function at which F $(\Theta_{min}, \phi_{min})$ is minimum is compared with the true position $(\Theta_{true}, \phi_{true})$.

The noise is presumed using the Gaussian with zero mean. The standard deviation fluctuates in the range of $10^{-10} \sim 10^{-8}$, according to the PLL receiver 131 which can measure the frequency of 400 MHz in the order of 0.1 Hz.

The designator $\Delta$ which is used to explain the fluctuation of the frequency has no influence on the precise position measurement so long as it is constant, as can be seen from the fact that the quadratic expression 7 was deleted from equation 5. All the results shown below except Table 6 can be presumed by $\Delta=10^{-6}$, however similar results can be obtained when $\Delta$ is assumed to be zero.

Figure 5:
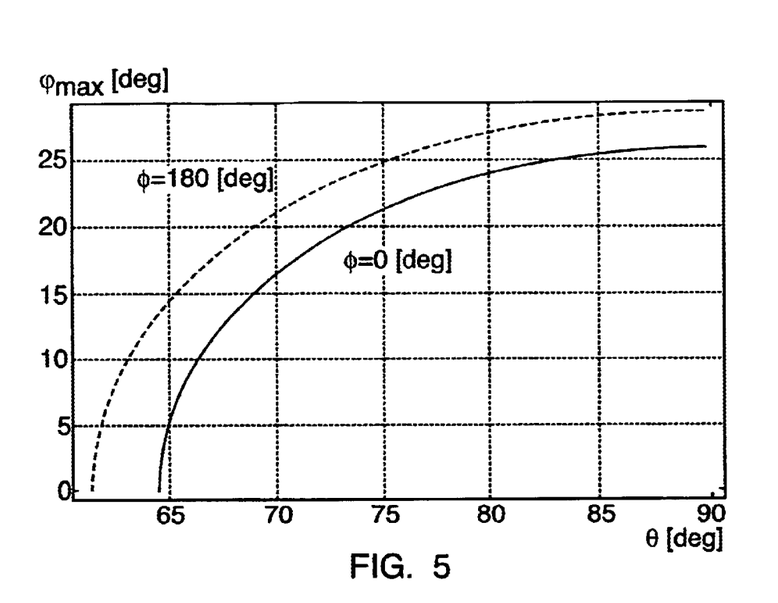
FIG. 5 is a chart showing the relationship between true and max, wherein the solid line and the dotted line represent $\phi_{true}=0$ and $\phi_{true}=\pi$, respectively.

As can be understood from the above discussion, the satellite 100 can receive the signal from the signal source 200 when the satellite 100 satisfies the expression 17. Therefore, true position $(\theta_{true}, \phi_{true})$ of the signal source 200 can be measured when $\phi$ satisfies the expression 17 in the predetermined distance $[\phi_{min}, \phi_{max}]$ including $[\phi 1 \phi N]$. For example, in $\phi_{true}=0$ or $\phi_{true}=\pi$, the maximum value of $\theta_{true}$ is obtained based on equation 19 and the distance $[\phi_{min}, \phi_{max}]$ for $\phi_{true}$ can be determined based on equation 18. In this case $\phi_{min}$ is identical to $-\phi_{max}$ and the relationship between $\theta_{true}$ and $\phi_{max}$ is shown in FIG. 5. In FIG. 5, the solid line and the dotted line represent $\phi_{true}=0$ and $\phi_{true}=\pi$, respectively. For example, when $\phi_{true}=0$, $\theta_{true}$ must be greater than 64 degrees. If $\theta_{true}$ is selected to be identical to 70 degrees, $\phi_{min}=17$ degrees. This means that when the signal source 200 is at the position of $(\theta_{true}, \phi_{true})=(70°, 0°)$, the sampling points $\{\phi_n\}_{n=1\sim N}$ must be located in the interval $[-17°, 17°]$.

In the simulation, when the position $(\theta_{true}, \phi_{true})$ of the signal source, obtained based on the true positions $(\theta_{true}, \phi_{true})$ of many signal sources 200, the sampling points $\{\psi_n\}_{n=1\sim N}$, and noise levels was $(80°, 10°)$, the 11 Doppler coefficients were measured, and the distance $[\psi 1, \psi 11]$ was equal to the $[-5°, 5°]$, the typical results as shown in Tables 2 through 5 were obtained. The satellite 100 moved by the abovementioned distance in about 163 seconds.

Figure 6:
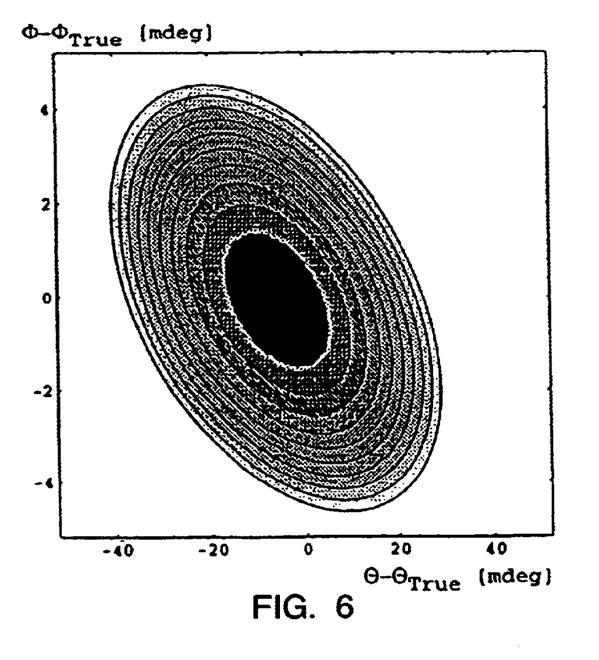
FIG. 6 is a chart showing a profile of the proximity function F ($\theta$, $\phi$), in which the measured Doppler coefficient $\{\epsilon_n^{meas}\}$ includes the standard deviation $10^{-9}$ mixed therein.

FIG. 6 shows a profile of the proximity function F $(\theta, \phi)$, in which the measured Doppler coefficient $\{\epsilon_n^{meas}\}$ includes the standard deviation $10^{-9}$ mixed therein.

The gray scale represents the value of the proximity function F. The darker the gray scale, the smaller the value. The horizontal axis (abscissa) represents $(\theta-\theta_{true})$, and the vertical axis (ordinate) represents $(\phi-\phi_{true})$, respectively. The unit of measured value is [mdeg]. In FIG. 6, 1 Mdeg= 0.001° corresponds to 111 m on the earth surface. It is found from FIG. 6 that the minimum point $(\theta_{min}, \phi_{min})$ is adjacent the true position $(\theta_{true}, \phi_{true})$.

If the noise component in the Doppler coefficient $\{\epsilon_n^{true}\}_{n=1\sim N}$ changes, the profile of the proximity function is slightly distorted, so that the minimum point $(\theta_{min}, \phi_{min})$ moves around the true position $(\theta_{true}, \theta_{true})$. For instance, if the noise level is maintained to be $10^{-9}$ and 32 sets of the Doppler coefficient $\{\epsilon_n^{true}\}_{n=1\sim N}$ is generated by changing the noise component, 32 minimum points corresponding to each case are plotted in FIG. 7.

Figure 7:
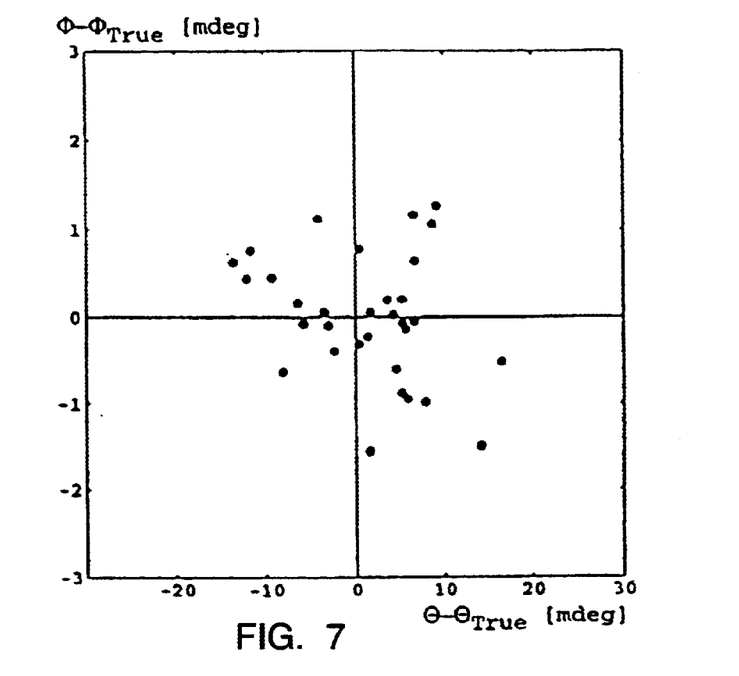
FIG. 7 is a chart showing 32 points corresponding to the Dopler coefficient $\{\epsilon_n^{true}\}_{n=1-11}$ generated by changing the noise component.

The minimum points are distributed around the true position within ±20 mdeg in the $\Theta$-axis direction and within ±2 mdeg in the $\phi$-axis direction. In the evaluation of the correct position, based on the standard deviation along each axis, the respective values are 7.3 mdeg and 0.72 mdeg. In order to minimize the proximity function, a function analysis software was used to obtain the minimum value. Four points $(\Theta_{true}\pm 10°, \phi_{true}\pm 10°)$ were used as initial positions. However, it was found that the values were always concentrated to the same point in the repetitive measurements.

Figure 8:
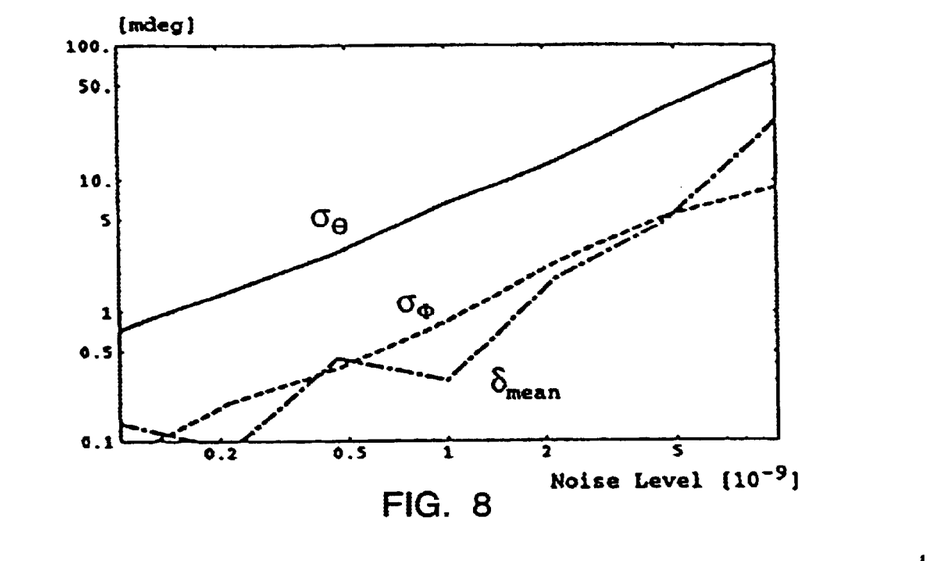
FIG. 8 is a chart showing the relationship between the precision limit and the noise level.

FIG. 8 shows a relationship between the precision limit and the noise level. In FIG. 8, $\sigma_\theta \sigma_\phi$ represent the standard deviations of $\theta_{min}\phi_{min}$, respectively. $(\theta_{min}, \phi_{min})$ is a mean value of $(\theta_{min}, \phi_{min})$ and is referred to as <mean evaluation position>. On the assumption that the mean value $\delta_{mean}$ shown in FIG. 8 is a deviation of $(\theta_{min}, \phi_{min})$ from $(\theta_{true}, \phi_{true})$, following equation (20) is set.

$$\delta_{mean} \equiv \sqrt{(\overline{\Theta}_{min} - \Theta_{true})^2 + (\overline{\Phi}_{min} - \Phi_{true})^2} \quad (20)$$

Equation 20 shows the measure of the bias of the evaluated values.

Thirty two calculations of $(\Theta_{min}, \phi_{min})$ are repeated for each noise level to calculate $\sigma_\Theta$, $\sigma_\phi$ and $\delta_{mean}$. Namely, $\sigma_\Theta$ and $\sigma_\phi$ are both proportional to the noise level or the standard deviation of the noise.

Figure 9:
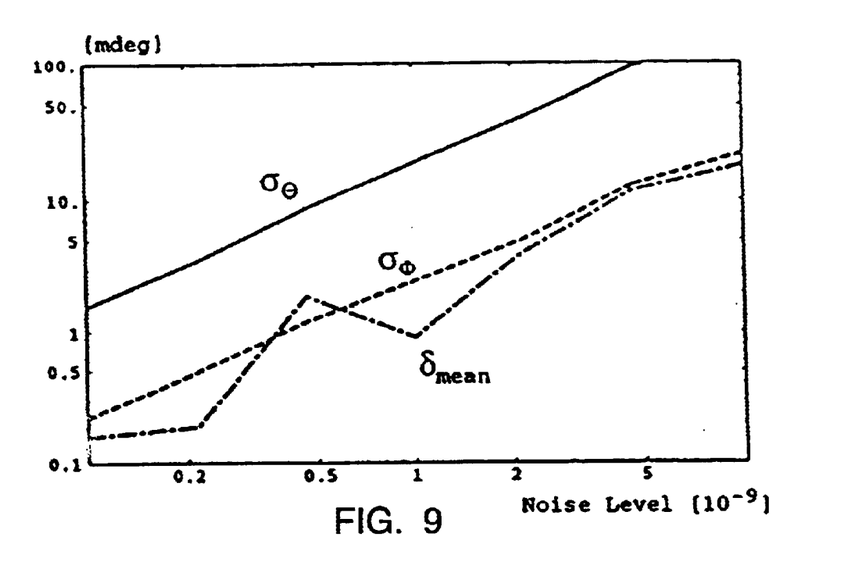
FIG. 9 is a chart showing the results obtained when 13 measurements of the Doppler coefficients were carried out in a measurement distance of $[\phi_1, \phi_{13}]=[-3°, 3°]$.

The results obtained when 13 measurements of the Doppler coefficients were carried out in a measurement distance of $[\phi_1, \phi_{13}]=[-3°, 3°]$ are shown in FIG. 9. The satellite 100 passed the measurement distance in 98 seconds. In this case, the sampling number N=13 was larger than that in the previous case but the distribution of the sampling points is limited to a narrow area. Moreover, similar to $\delta_{mean}$, the values of $\sigma_\theta$ and $\sigma_\phi$ are larger than those in FIG. 8.

According to the method of the present invention, a change in $\Delta$ can be ignored during the position measuring operation. However, In the actual measurement, a change inevitably occurs. In a precise simulation of the measurement, the measurement is influenced by change. To obtain the result shown in FIG. 8, $\Delta$ was linearly increased by $10^{-9}$ during the movement of satellite 100 in the distance

Figure 10:
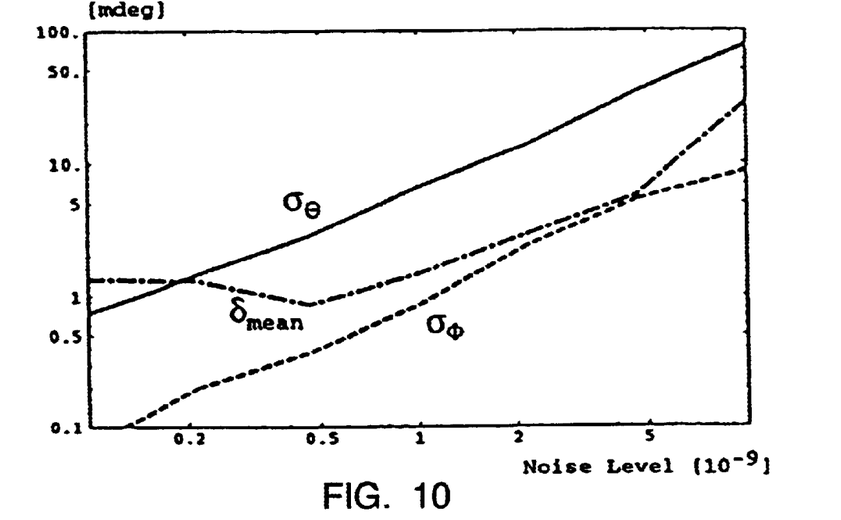
FIG. 10 is a chart showing the relationship between the precision limit and the noise level, wherein the change in $\Delta$ is not ignored.

[−5°, 5°]. The results thereof are shown in FIG. 10. In FIG. 10, $\sigma_\theta$ and $\sigma_\phi$ are almost identical to those in FIG. 8, but $\delta_{mean}$ is considerably greater than that shown in FIG. 10. This means that the minimum position ($\theta_{min}$, $\phi_{min}$) in connection with the proximity function caused the evaluation of the position of the signal source 200 to be deviated if Δ changes during the measurement of the position. The larger the change of Δ, the greater the deviation of the evaluation.

As can be understood from the above discussion, according to the position measuring satellite system of the present invention, it can be seen from FIGS. 8 and 9 that if the period of time in which the whale appears on the sea surface is extremely short, the measurement interval is shortened, so that the position measurement error of the signal source 200 is increased. However, according to the whale's general behavior, the whale dives in the sea and thereafter rises to the sea in a few minutes at a point not far from the diving point. If the rising point is out the measurement range, the measurement distance [$\phi_1$, $\phi_N$] is increased, but the Doppler coefficient is measured again, In any event, if the range of ($\phi_N$−$\phi_1$) is not similar than 10°, and the standard deviation of the noise is not greater than $10^{-9}$, the position measurement errors $\sigma_\theta$ and $\sigma_\phi$ of the signal source 200 are less than 5 mdeg=500 m, as shown in FIG. 8, and are comparable to the prior art (e.g., Argos [3]).

As can be understood from the foregoing, according to the position measuring satellite system of the present invention, since the signal source is only required to emit the signal radio wave, it is possible to measure the position of an animal even if it appears on the sea surface within a very short space of time, such as a whale, by emitting the signal radio wave for a time long enough to specify the position of the signal source. Moreover, if the satellite moves along a polar orbit, it is possible to cover the overall surface of the earth by a single base station.

According to the above description, the signal radio wave emitted from the signal source is received to measure the frequency thereof; the position of the satellite is precisely measured by the GPS receiver provided on the satellite; the measurement data is stored in the memory; the stored data is transmitted to the apparatus on the earth; and the position of the signal source is measured by the apparatus on the earth. Moreover, since the signal source is only required to emit the signal radio wave, the signal source can be made small and light, so that the service life of the batteries can be prolonged, whereby the measurement can be carried out for a long time.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A satellite system comprising:
   a signal source located on or in at least one of a surface of the earth, a surface of water, and the air, said signal source including an emitter device for emitting a radio wave signal having a predetermined frequency;
   an orbiting satellite for measuring a position of said signal source, said orbiting satellite including a GPS receiver which receives a GPS signal from a GPS satellite system to measure the position of said orbiting satellite, a frequency measuring device for receiving the radio wave signal emitted from the signal source to measure the frequency of said radio wave signal, a memory for storing frequency data measured and obtained by the frequency measuring device and position data measured and obtained by the GPS receiver upon measurement of the frequency of said radio signal, and a satellite transmitting device for transmitting from said orbiting satellite the data stored in said memory toward the earth's surface; and
   a ground station having a ground-station signal receiving device for receiving said data transmitted from said orbiting satellite, said ground station comprising a computer for calculating the position of said signal source based on the received data of said signal receiving device, and a ground-station transmitting device for transmitting a specific command to send the data stored in said memory of the orbiting satellite;
   said orbiting satellite including a satellite signal receiving device for receiving the radio wave signal emitted from the ground station; and
   said orbiting satellite transmitting the data stored in the memory via the satellite transmitting device upon receipt of the specific command through the satellite signal receiving device.

2. A satellite system according to claim 1, wherein said frequency measuring device comprises a phase-lock loop receiver.

3. A satellite system according to claim 1, wherein said frequency measuring device and said GPS receiver carry out several measurements of the radio wave signals emitted from the same signal source during the movement of said orbiting satellite, on and along the same orbit, on which the frequency measuring device and the GPS receiver are provided so that the measurement data of each measurement if stored in said memory.

4. A satellite system according to claim 1, wherein said orbit of the orbiting satellite is one of a polar orbit and a sub-recurrent orbit.

5. A satellite system according to claim 1, wherein said computer measures the position of the signal source based on reference frequency data of the radio wave signal emitted from the signal source; wherein the frequency data is measured by the frequency measuring device, and the position data of the orbiting satellite is measured by the GPS receiver.

6. A satellite system according to claim 1, wherein when the radio wave signal of the predetermined frequency is emitted, said signal source sends an identification signal to identify the signal source by the radio wave signal.

7. A satellite system comprising:
   a signal source located on or in at least one of a surface of the earth, a water surface, and the air; and
   an orbiting satellite for measuring a position of said signal source, said orbiting satellite including a GPS receiver which receives a GPS signal from a GPS stationary satellite, a frequency measuring device for receiving a radio wave signal emitted from a ground signal source on the earth to measure the frequency of the radio wave signal, a memory for storing frequency data measured and obtained by the frequency measuring device and position data measured and obtained by the GPS receiver upon measurement of said frequency, and a satellite transmitting device for transmitting the data stored in the memory toward a ground station;
   wherein
   said orbiting satellite comprises a satellite signal receiving device for receiving the radio wave signal emitted from the ground station;

said ground station comprises a ground-station transmitting device for transmitting a specific command to send the data stored in the memory of the orbiting satellite; and said orbiting satellite transmits the data stored in the memory through the satellite transmitting device upon receipt of the specific command through the satellite signal receiving device.

8. A satellite system according to claim 7, wherein said frequency measuring device comprises a phase-lock loop receiver.

9. A satellite system according to claim 7, wherein said frequency measuring device and said GPS receiver carry out several measurements of said radio wave signals emitted from the same signal source during the movement of the orbiting satellite, on and along the same orbit, on which the frequency measuring device and the GPS receiver are provided so that the measurement data of each measurement is stored in the memory.

10. A satellite system according to claim 9, wherein the orbit of the orbiting satellite is a polar orbit.

11. A satellite system according to claim 9, wherein when the radio wave signal of the predetermined frequency is emitted, said signal source sends an identification signal to identify the signal source by the radio wave signal.

* * * * *

UNITED STATES PATENT AND TRADEMARK OFFICE
CERTIFICATE OF CORRECTION

PATENT NO. : 6,680,696 B1
DATED : January 20, 2004
INVENTOR(S) : Tomonao Hayashi It is certified that error appears in the above-identified patent and that said Letters Patent is hereby corrected as shown below:

<u>Column 14,</u>
Line 6, please delete "9" and insert -- 7 --
Line 8, please delete "9" and insert -- 7 --

Signed and Sealed this

Twentieth Day of April, 2004

JON W. DUDAS
*Acting Director of the United States Patent and Trademark Office*